United States Patent
Ng et al.

(10) Patent No.: US 9,600,140 B2
(45) Date of Patent: Mar. 21, 2017

(54) INPUT DEVICE AND INTERFACES FOR MOTOR VEHICLE

(75) Inventors: Brian Ng, San Francisco, CA (US); Vickie Chiang, Sunnyvale, CA (US); Arne Stoschek, Palo Alto, CA (US)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 946 days.

(21) Appl. No.: 12/702,371

(22) Filed: Feb. 9, 2010

(65) Prior Publication Data

US 2010/0205558 A1   Aug. 12, 2010

Related U.S. Application Data

(60) Provisional application No. 61/151,319, filed on Feb. 10, 2009.

(51) Int. Cl.
*G06F 3/00* (2006.01)
*G06F 3/0482* (2013.01)

(52) U.S. Cl.
CPC ................................. *G06F 3/0482* (2013.01)

(58) Field of Classification Search
CPC .............. G06F 3/0481; H04N 21/4622; H04N 5/44543; H04N 2005/44556
USPC ....... 715/716, 717, 737, 764, 779, 780, 810, 715/825, 864; 345/173; 725/37
See application file for complete search history.

(56) References Cited

U.S. PATENT DOCUMENTS

| | | | |
|---|---|---|---|
| 5,270,689 A | 12/1993 | Hermann | |
| 7,823,066 B1* | 10/2010 | Kuramura | 715/717 |
| 7,844,905 B2* | 11/2010 | Bateman | 715/744 |
| 2006/0146037 A1 | 7/2006 | Prados et al. | |
| 2006/0227066 A1* | 10/2006 | Hu et al. | 345/7 |
| 2007/0130370 A1* | 6/2007 | Akaezuwa | 710/1 |
| 2007/0256100 A1* | 11/2007 | Jeong | H04N 5/44543 725/40 |
| 2007/0271530 A1* | 11/2007 | Klos et al. | 715/825 |

FOREIGN PATENT DOCUMENTS

| | | |
|---|---|---|
| DE | 101 39 693 | 5/2002 |
| DE | 10 2004 023 636 | 12/2005 |
| EP | 0 366 132 | 5/1990 |
| EP | 1 689 608 | 8/2006 |

OTHER PUBLICATIONS

Search Report, German Patent Application No. 10 2010 006 282.0, mailed Jul. 29, 2010.

* cited by examiner

*Primary Examiner* — Haoshian Shih
(74) *Attorney, Agent, or Firm* — Andrews Kurth Kenyon LLP

(57) ABSTRACT

A motor vehicle includes an input device for the input of a search criterion or a search term, a first interface for the exchange of data with a first offboard data memory, a second interface for the exchange of data with a second offboard data memory, and a computing device for the automatic search for information corresponding to the search criterion or the search term in the first onboard data memory and in the second onboard data memory.

9 Claims, 6 Drawing Sheets

INPUT DEVICE AND INTERFACES FOR MOTOR VEHICLE

CROSS-REFERENCE TO RELATED APPLICATIONS

The present application claims the benefit of U.S. Provisional Patent Application Ser. No. 61/151,319, filed on Feb. 10, 2009, which is expressly incorporated herein in its entirety by reference thereto.

FIELD OF THE INVENTION

The present invention relates to a motor vehicle having an input and operating device for the operator control of the motor vehicle.

BACKGROUND INFORMATION

According to German Published Patent Application No. 101 39 693, in the context of modern electronic devices in a vehicle that are constantly offering additional functions with more and more options, because of the limited installation space for the associated operating elements, multi-function operating elements have been created, by which various functions of the connected devices are operable. Thus, for example, European Published Patent Application No. 0 366 132 describes a multi-function operating device for motor vehicles, where function groups and individual functions are selected with the aid of a rotary switch, and where an ENTER function can be triggered, one and the same bidirectional rotary switch being used for selecting menus and individual functions. This rotary switch has click-stop positions to which menus or individual functions are assigned, the ENTER function being able to be initiated by an axial motion of the rotary switch. Such a multi-function operating device is used, for example, to enter a destination into a navigation system. To that end, an alphanumeric keyboard is depicted on a display unit, the user being able to move forwards and backwards in the alphanumeric keyboard with the aid of the bidirectional motion of the rotary switch. When the cursor is located on the desired alphanumeric character, the character may then be selected by an axial motion of the rotary switch and transferred into the navigation system.

Moreover, it is described, for example, in U.S. Patent Application Publication No. 2006/0146037, which is expressly incorporated herein in its entirety by reference thereto, to implement similar menu-driven operating concepts with the aid of touchscreens in a motor vehicle. U.S. Patent Application Publication No. 2006/0146037 describes an input device for a motor vehicle, having a touchscreen for the input of commands by touching an operating surface or by pressing on the operating surface, an actuator for moving the touchscreen in at least one direction relative to a reference element, and an essentially U-shaped spring for the mechanical connection of the touchscreen to the reference element.

SUMMARY

Example embodiments of the present invention improve and simplify the operator control of a motor vehicle. In so doing, it is especially desirable that to the greatest extent possible, the driver not be distracted from the traffic situation, even when operating complex devices. In particular, operator control of a motor vehicle should be able to be accomplished very quickly.

According to example embodiments of the present invention, a motor vehicle includes an input device for the input of a search criterion or a search term, a first interface for the exchange of data with a first offboard data memory, a second interface for the exchange of data with a second offboard data memory, and a computing device for the automatic search for information corresponding to the search criterion or the search term in the first onboard data memory and in the second onboard data memory. In this context, the computing device performs the search, in particular, after input of the search criterion or the search term, and a command for the search.

In example embodiments of the present invention, the motor vehicle additionally includes a third interface for the exchange of data with a third offboard data memory, the computing device being implemented to automatically search for information corresponding to the search criterion or the search term in the first offboard data memory, in the second offboard data memory and in the third offboard data memory. It may be provided for the motor vehicle to additionally include a display for displaying information found with the aid of the computing device.

In example embodiments of the present invention, the motor vehicle additionally includes a display for displaying information found with the aid of the computing device. The input device may take the form of a touchscreen situated over the display.

In addition, a motor vehicle may include an input device for the input of a search criterion or a search term, having an onboard data memory and having an interface for the exchange of data with an offboard data memory, the motor vehicle including a computing device for the automatic search for information corresponding to the search criterion or the search term in the onboard data memory and in the offboard data memory. In this context, the computing device performs the search, in particular, after input of the search criterion or the search term, and a command for the search.

The motor vehicle may additionally include a display for displaying information found with the aid of the computing device. The input device may take the form of a touchscreen situated over the display.

The motor vehicle may additionally include a second interface for the exchange of data with a second offboard data memory, the computing device being implemented to automatically search for information corresponding to the search criterion or the search term in the first offboard data memory, in the second offboard data memory and in the onboard data memory.

A motor vehicle may be, e.g., a land vehicle that may be used individually in road traffic. It should be appreciated that motor vehicles are not restricted to land vehicles having an internal combustion engine.

An onboard data memory may also be denoted as an internal data memory. An onboard data memory may be, e.g., a data memory (permanently) integrated into a motor vehicle. An onboard data memory may be, e.g., a data memory not to be removed from the motor vehicle during normal use of the motor vehicle (by a user of the motor vehicle). An onboard data memory may be, e.g., an arrangement of two or more distributed data memories not to be removed from the motor vehicle during normal use of the motor vehicle (by a user of the motor vehicle). For example, an onboard data memory may include one hard disk or a plurality of hard disks.

An offboard data memory may also be denoted as an external data memory. An offboard data memory may be, e.g., a data memory removable from the motor vehicle during normal use of the motor vehicle (by a user of the motor vehicle). For example, an offboard data memory may be a CD or a DVD. A corresponding interface of a motor vehicle may be a suitable CD or DVD player. An offboard data memory may also be an SD (secure digital) card. For instance, a corresponding interface of the motor vehicle may be an SD-card reading device. An interface may, for example, be a Bluetooth interface. A corresponding offboard data memory may be a mobile telephone, for example, or an MP3 function of a mobile telephone. However, an offboard data memory may also be a data memory which is accessed with the aid of the mobile telephone via a telephone connection. For example, if the mobile telephone has an Internet function, an offboard data memory may be a data memory reachable via the Internet. An interface may be a radio, for example, or a satellite radio. A corresponding offboard data memory may be the radio transmitter or station, for example. An interface may, for example, also be a USB interface. A corresponding offboard data memory may be a USB stick, for example, or an MP3 player. An offboard data memory may also be a Blu-ray Disc. A corresponding interface may be a Blu-ray player. An interface may also be an Internet interface such as WLAN, for example. A corresponding offboard data memory may then, in turn, be an (external) data memory reachable via the Internet.

The computing device may include one or more of the following forms described with reference to a computing device denoted hereinafter by way of example as search engine. For example, using a search engine, a user is able to search for a specific medium. For instance, if a user searches for a specific music title, he/she is able to enter this title as a whole or a part of this title using the input device. The search engine thereupon searches through all available onboard and offboard data memories for this title, and presents the result with the aid of the display and/or a voice output and/or plays the result title. If the search engine finds several hits or matches, it outputs and/or displays a list of these hits to the user. The user is then able to select one hit from this list. This procedure, described by way of example with reference to a music title, the search engine also permits with regard to videos, images, text or operating instructions.

The search engine also allows the search for a specific medium category. If a user is searching for a specific genre (e.g., classic, rock, jazz, etc.) or music of a specific artist (e.g., U2, Michael Jackson, Rolling Stones, etc.), the search engine searches in all available onboard and offboard data memories for titles of this genre or this artist. The output may again take place visually with the aid of the display and/or acoustically. It may also be provided for the found hit to be played immediately. If the search has yielded several hits, it may be provided for the user to again be able to select from a list.

In the case of streaming media (e.g., radio), the search engine indicates—up to the limit of the list output by the streaming medium—which title(s) will be played next. For example, this indicated list includes title, artist, genre, station, etc., as well as the time when the corresponding title will be broadcast. For instance, if a user wants to hear international news at the next possible time, he/she may input this as key words into the search engine which outputs the stations and times of the next international news as result on the display. This output and search, respectively, may be carried out without interrupting the playing of a title of the medium selected at the moment. If a user selects a time and a station, the search engine will automatically switch to this station at the selected time.

If the hits of streaming media include navigation information (geocoordinates, GPS markers, etc.), the user is allowed to navigate to the indicated location. In this case, the search engine will transfer all necessary data to the navigation system. For example, if the results of a search contain a digital image with associated geocoordinates, the user may select the image and select the option "navigate to." The search engine will then transfer the corresponding coordinates to the navigation system.

Using the search engine, it is also possible to search for key words in the user manual of the motor vehicle. For example, this user manual may be stored on a hard disk stored in the motor vehicle.

In addition, it may be provided for the search engine to support recurring search terms or patterns, and in each case to display a list which contains the input just executed. A search term or title may then be selected from this list. Alternatively, the title or search term sought may, of course, be entered manually. Advantageously, the search engine independently recognizes available data memories, especially available offboard data memories. Thus, in particular, it is provided that the search engine recognizes when a USB stick is inserted into the USB interface.

Further features and aspects of example embodiments of the present invention are described below with reference to the appended Figures.

DETAILED DESCRIPTION

Figure 1:
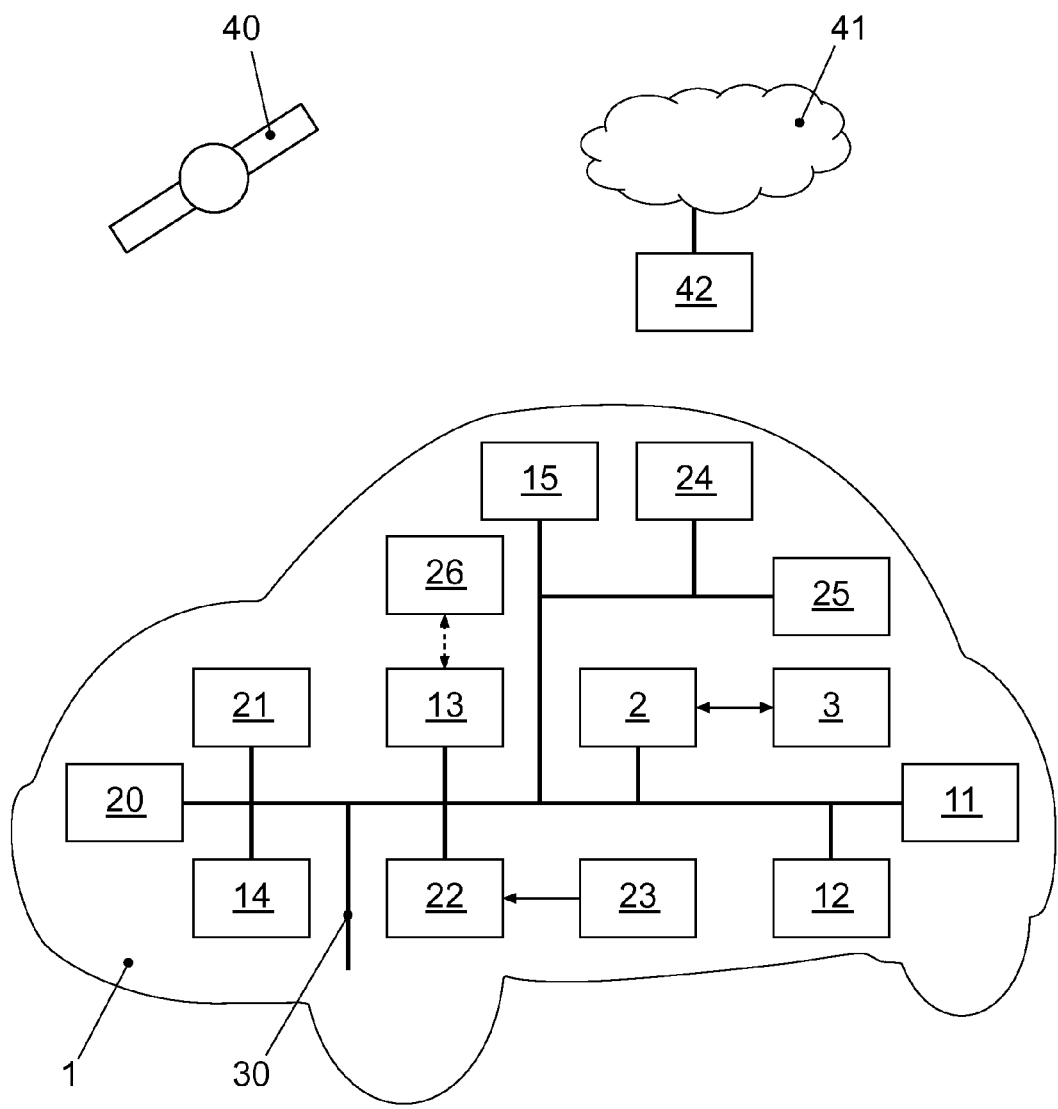
FIG. 1 schematically illustrates an example embodiment of a motor vehicle.

FIG. 1 shows an exemplary embodiment of a motor vehicle 1 in a basic representation. Motor vehicle 1 includes a display and operator-control unit 3, as well as a display and operating control 2 for driving display and operator-control unit 3. Display and operator-control unit 3 includes a matrix display for the variable display of information, and a touchscreen, situated over the display, for the input of information and commands.

In addition, motor vehicle 1 includes a navigation module 11 that is operable with the aid of display and operator-control unit 3, and that is connected to an antenna to receive locating information (e.g., GPS or Dead Reckoning (DR)) sent out by satellite 40. Navigation module 11 is connected via a bus system 30 and display and operating control 2. Motor vehicle 1 further includes an automatic climate control 12, which is operable using display and operator-control unit 3.

Moreover, motor vehicle 1 includes a USB interface 22, a CD player 14, a hard disk 20 on which music titles are stored, for instance, an SD-card reading device 21, a Bluetooth interface 13, a radio 15 and a WLAN interface 24. USB interface 22 is connected via bus system 30 to display and operating control 2, so that an MP3 player 23 connected to USB interface 22 is operable with the aid of display and operator-control unit 3. CD player 14, radio 15, hard disk 20 and SD-card reading device 21 are connected by bus system 30 to display and operating control 2, and are able to be operated or read out with the aid of display and operator-control unit 3. In addition, a mobile telephone, denoted by reference numeral 26, is operable by display and operator-control unit 3 via the connection made up of Bluetooth interface 13, bus system 30 and display and operating control 2. Moreover, access to Internet 41 via fixed nodes 42 is possible with the aid of display and operator-control unit 3 by way of WLAN interface 24.

Figure 2:
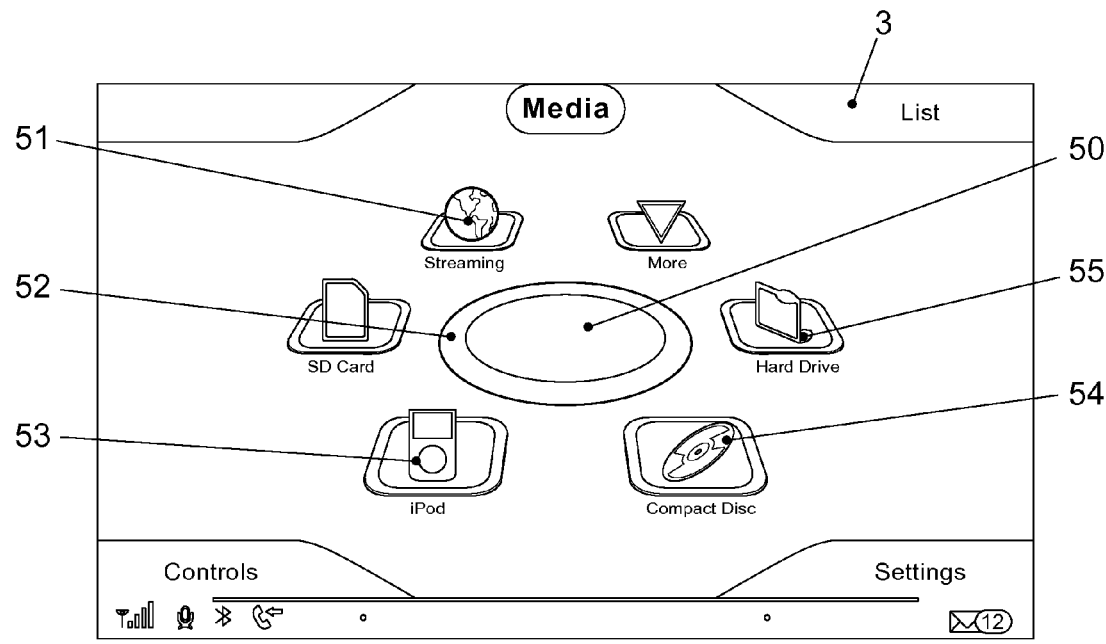
FIG. 2 shows an exemplary embodiment of a main menu.

In addition, motor vehicle 1 includes a search engine 25 which is coupled to bus system 30, and is operable using display and operator-control unit 30. Search engine 25 is an exemplary embodiment for a computing device. It may also be implemented or located in display and operating control 2. The operator control of motor vehicle 1 takes place in menu-driven fashion with the aid of display and operator-control unit 3. A main menu, shown in FIG. 2, for the operator control of search engine 25 is able to be called up from a master menu, from which, for example, a screen form for operating navigation module 11 or automatic climate control 12 may also be called up. An Internet browser is able to be called up by touching the touchscreen in the area of symbol 51. By touching the touchscreen in the area of symbol 52, it is possible to access the SD-card reading device. An MP3 player, connected to the USB interface, may be operated by touching the touchscreen in the area of symbol 53. By touching the touchscreen in the area of symbol 54, a menu for operating the CD player is called up. By touching the touchscreen in the area of symbol 55, a menu for the operator control of the hard disk is called up.

Figure 3:
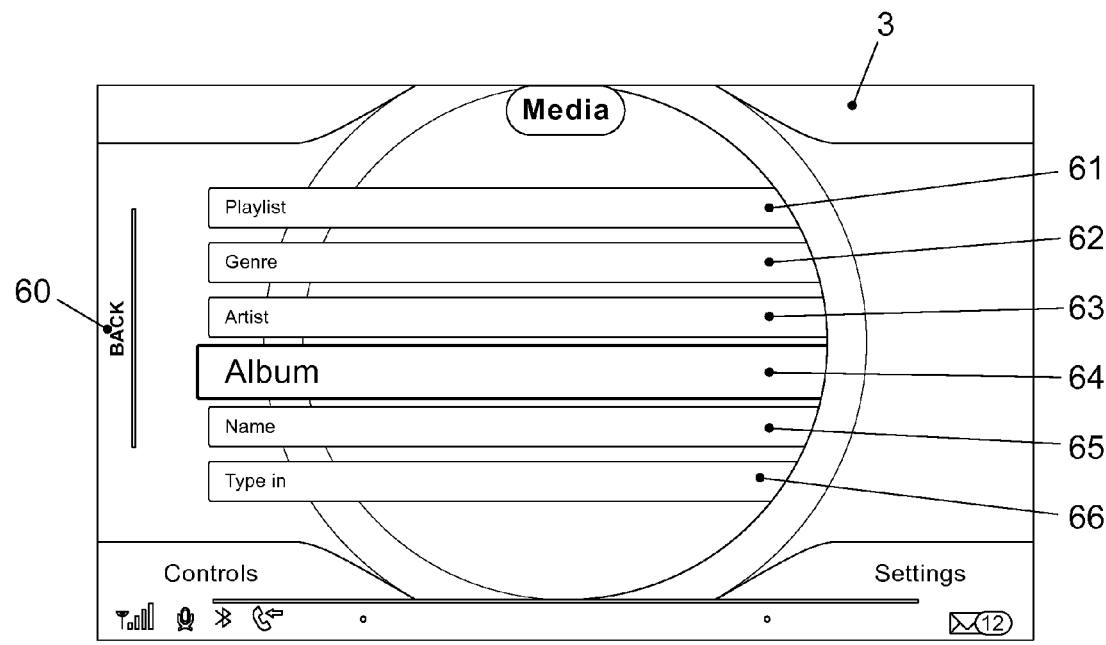
FIG. 3 shows an exemplary embodiment of a secondary menu.

A menu shown in FIG. 3 is called up by touching the touchscreen in the area of symbol 50. The menu screen according to FIG. 3 shows a list of selectable subpoints. A button 61 is shown for calling up a list of the last played music titles; a button 62 is shown for the selection of music titles sorted according to genre; a button 63 is shown for calling up a menu to search for an artist; a button 64 is shown for calling up a search form to search for an album; and a button 65 is shown for calling up a search form to search for a name. Moreover, a symbol 60 is shown, touching the touchscreen in the area of symbol 60 resulting in a return to the menu shown in FIG. 2.

Figure 4:
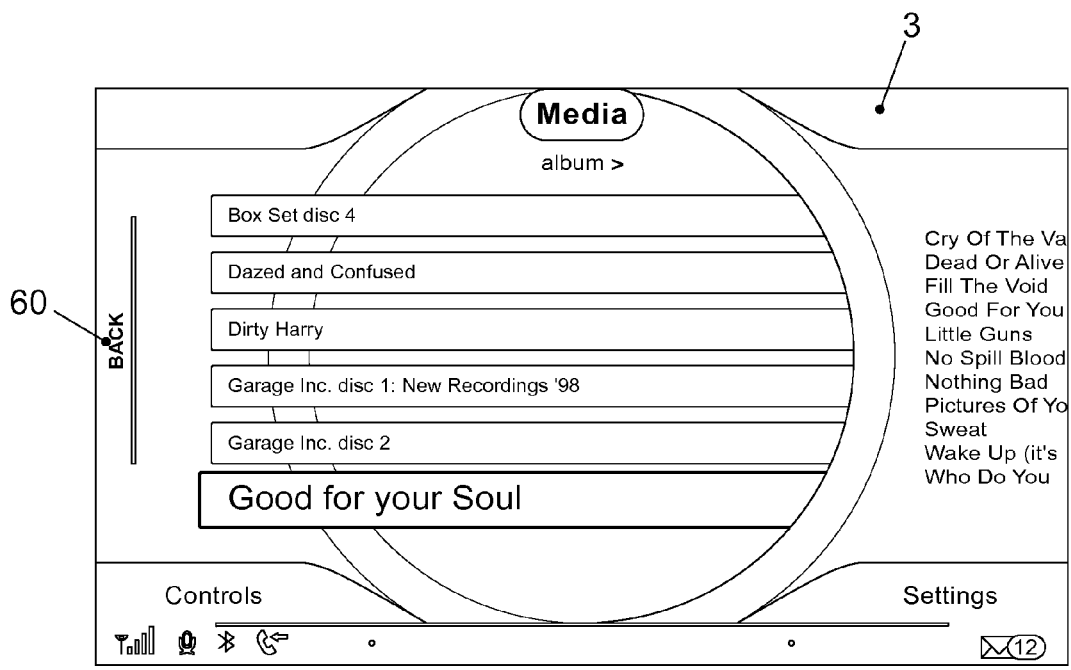
FIG. 4 shows a further exemplary embodiment of a secondary menu.

If a user selects button 64—as shown in FIG. 3—then a selection of albums is offered—as shown in FIG. 4—regardless of whether they are stored on a CD, in MP3 player 23, in mobile telephone 26, on the SD card or on hard disk 20. Moreover, it may be provided to display albums available via Internet 41, as well.

Figure 5:
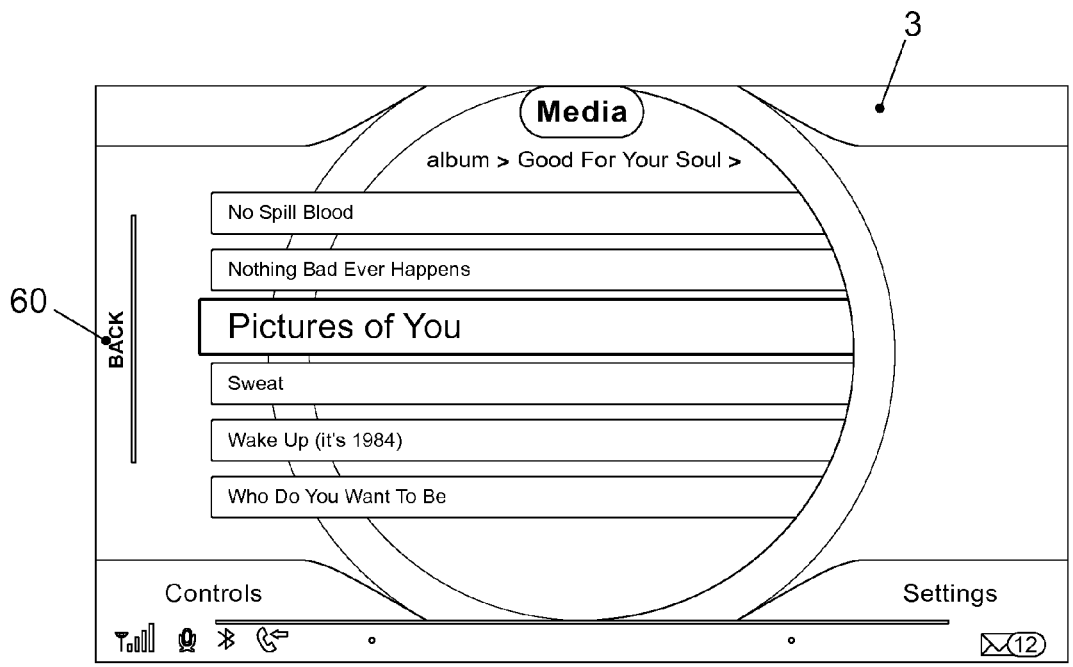
FIG. 5 shows a further exemplary embodiment of a secondary menu.
Figure 6:
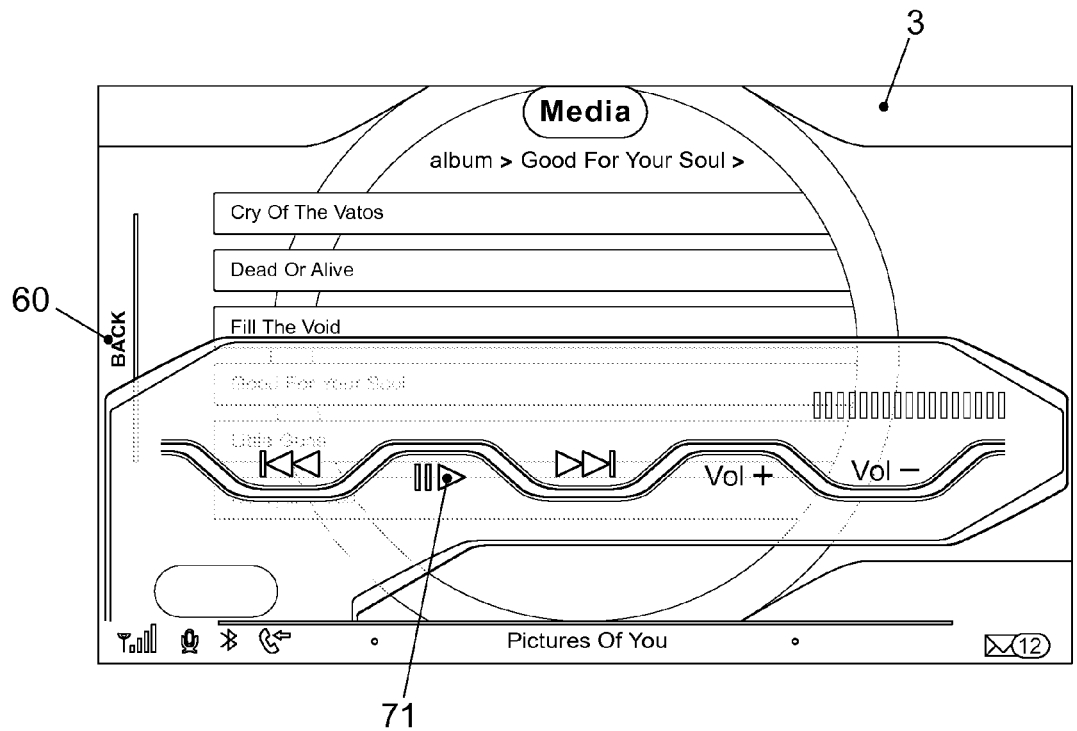
FIG. 6 shows a further exemplary embodiment of a secondary menu.
Figure 7:
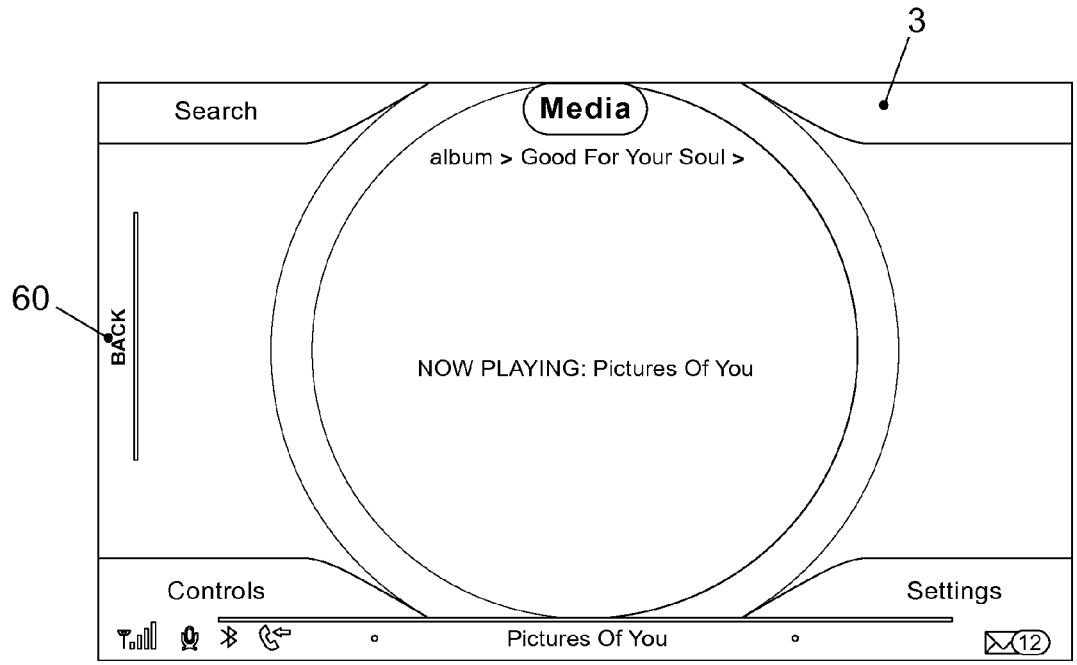
FIG. 7 shows a further exemplary embodiment of a secondary menu.

By selecting an album through touching the touchscreen in the area of its display, the contents of this album are displayed, as shown in FIG. 5. If a music title like, for instance, with reference to FIG. 5, "Pictures of You" is selected by touching the touchscreen in the area of the display of the music title, then—as shown in FIG. 6—a menu is displayed having information about this music title. By touching the touchscreen in the area of a play button 71, the corresponding music title is played. Moreover—as shown by way of example in FIG. 7—a display appears having a confirmation that the desired music title is being played.

Figure 8:
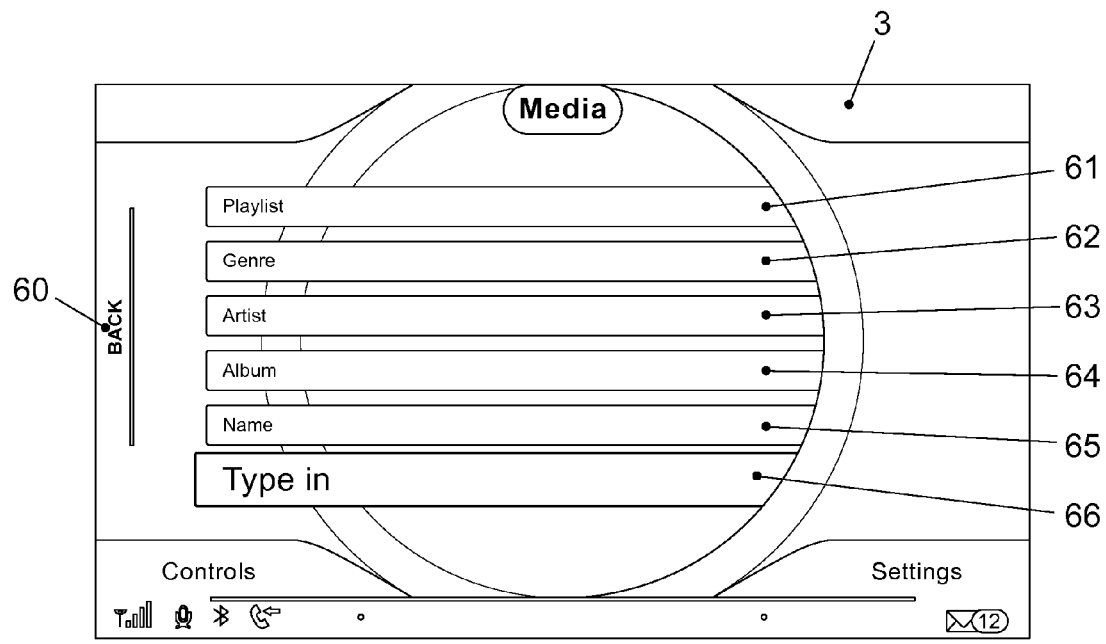
FIG. 8 shows a further exemplary embodiment of a secondary menu.
Figure 9:
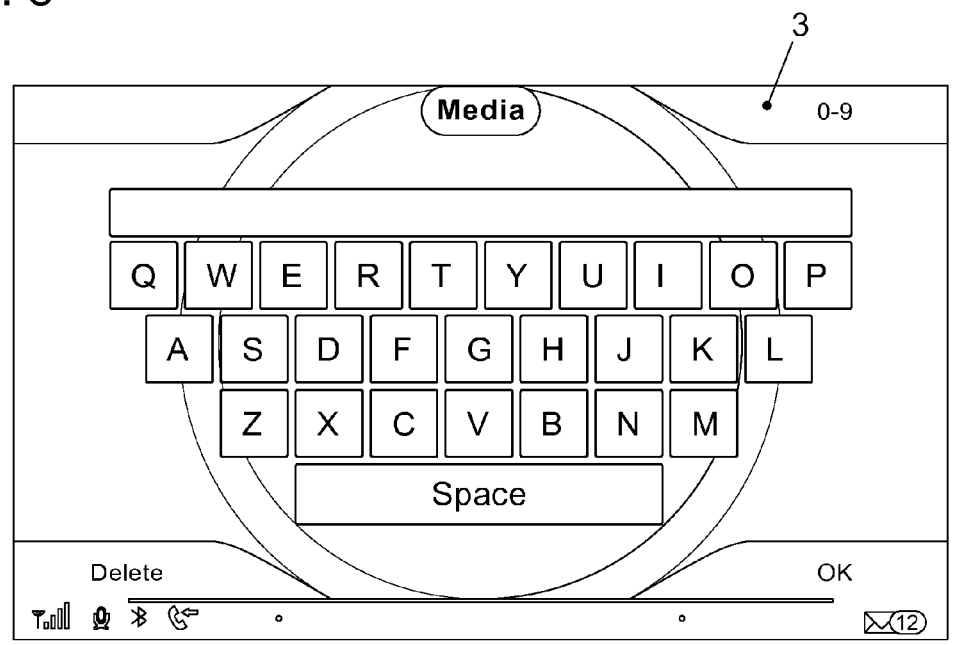
FIG. 9 shows a further exemplary embodiment of a secondary menu.
Figure 10:
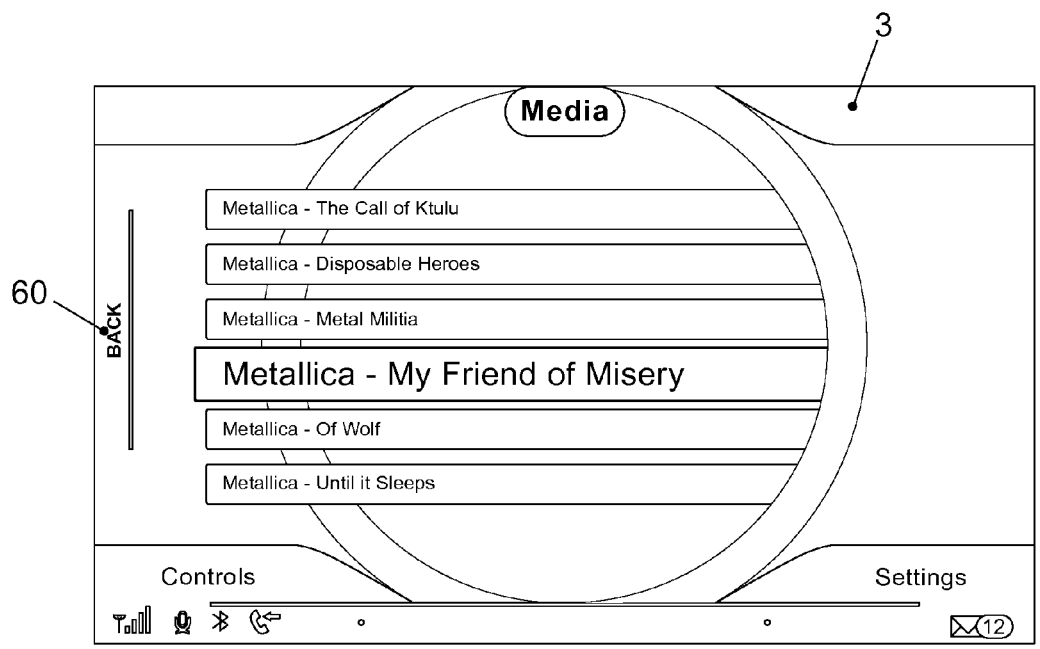
FIG. 10 shows a further exemplary embodiment of a secondary menu.
Figure 11:
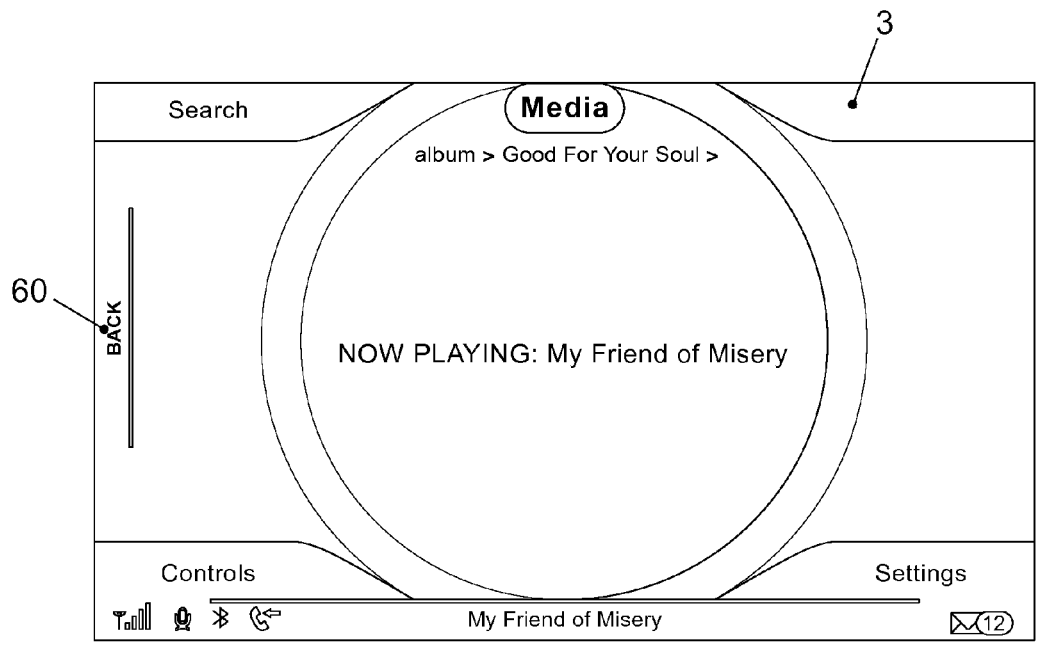
FIG. 11 shows a further exemplary embodiment of a secondary menu.

If—as shown in FIG. 8—the touchscreen is not touched in the area of button 64, but rather in the area of button 66, a screen form, shown in FIG. 9, is called up for the free input of text using a keyboard represented on the display. If, for example, the word "Metallica" is entered using the keyboard, search engine 25 then searches in MP3 player 23, on CD 14, on hard disk 20, on the SD card, in telephone 26, among the stations received by radio 15 and possibly in Internet 41 for matches or music titles which contain the word "Metallica" in the title or as supplementary information such as, for example, album or artist, and brings a corresponding list—as shown in FIG. 10—to display with the aid of display and operator-control unit 3. From this list, the operator is able to select a music title by touching the touchscreen in the area of its display. For instance, if the touchscreen is touched in the area of the display "My Friend of Misery," this music title is played. Moreover, a display again appears, which tells the user what music title is being played. Such a display is shown by way of example in FIG. 11.

LIST OF REFERENCE NUMERALS

1 motor vehicle
2 display and operating control
3 display and operator-control unit
11 navigation module
12 automatic climate control
13 Bluetooth interface
14 CD player
15 radio
20 hard disk
21 SD-card reading device
22 USB interface
23 MP3 player
24 WLAN interface
25 search engine
30 bus system
40 satellite
41 Internet
42 fixed node
50, 51, 52, 53,
54, 55, 60 symbol
61, 62, 63, 64,
65, 66 button
71 play buttons

What is claimed is:
1. A motor vehicle, comprising:
an input device adapted to input at least one of (a) a search criterion and (b) a search term;
a first interface adapted to exchange data with a first offboard data memory containing streaming media to be broadcast at various future times;
a second interface adapted to exchange data with a second offboard data memory containing non-broadcast media;
a computing device adapted to automatically search for information corresponding to the at least one of:
(a) the search criterion; and
(b) the search term;

in the first offboard data memory and in the second offboard data memory; and a media playback device for playing an individual media item selected from a list of media items included in information found with the aid of the computing device;

wherein when the individual media item is an item of the streaming media, the computing device automatically switches to the item of the streaming media at a corresponding broadcast time, causing the media playback device to play the item of the streaming media.

2. The motor vehicle according to claim 1, further comprising a third interface adapted to exchange data with a third offboard data memory, the computing device adapted to automatically search for information corresponding to the at least one of (a) the search criterion and (b) the search term in the first offboard data memory, in the second offboard data memory, and in the third offboard data memory.

3. The motor vehicle according to claim 2, further comprising a display adapted to display information found with the aid of the computing device.

4. The motor vehicle according to claim 1, further comprising a display adapted to display information found with the aid of the computing device.

5. The motor vehicle according to claim 4, wherein the input device is arranged as a touchscreen disposed over the display.

6. A motor vehicle, comprising:

an input device adapted to input at least one of (a) a search criterion and (b) a search term;

an onboard data memory containing non-broadcast media;

a first interface adapted to exchange data with a first offboard data memory containing streaming media to be broadcast at various future times;

a computing device adapted to automatically search for information corresponding to the at least one of
(a) the search criterion; and
(b) the search term;
in the onboard data memory and in the first offboard data memory; and a media playback device for playing an individual media item selected from a list of media items included in information found with the aid of the computing device;

wherein when the individual media item is an item of the streaming media, the computing device automatically switches to the item of the streaming media at a corresponding broadcast time, causing the media playback device to play the item of the streaming media.

7. The motor vehicle according to claim 6, further comprising a display adapted to display information found with the aid of the computing device.

8. The motor vehicle according to claim 7, wherein the input device is arranged as a touchscreen disposed over the display.

9. The motor vehicle according to claim 6, further comprising a second interface adapted to exchange data with a second offboard data memory, the computing device adapted to automatically search for information corresponding to the at least one of (a) the search criterion and (b) the search term in the first offboard data memory, in the second offboard data memory and in the onboard data memory.

* * * * *